United States Patent
Zou et al.

(10) Patent No.: US 7,653,005 B2
(45) Date of Patent: Jan. 26, 2010

(54) METHOD, DEVICE AND SYSTEM FOR MONITORING NETWORK PERFORMANCE

(75) Inventors: Yong Zou, Guangdong Province (CN); Yuntao Huang, Guangdong Province (CN)

(73) Assignee: Huawei Technologies Co., Ltd., Shenzhen (CN)

(*) Notice: Subject to any disclaimer, the term of this patent is extended or adjusted under 35 U.S.C. 154(b) by 564 days.

(21) Appl. No.: 11/615,177

(22) Filed: Dec. 22, 2006

(65) Prior Publication Data

US 2007/0165535 A1  Jul. 19, 2007

(30) Foreign Application Priority Data

Dec. 22, 2005  (CN) ................. 2005 1 0121232

(51) Int. Cl.
*H04L 12/26* (2006.01)
(52) U.S. Cl. ....................................... 370/252
(58) Field of Classification Search .................. 370/252
See application file for complete search history.

(56) References Cited

U.S. PATENT DOCUMENTS

| | | | |
|---|---|---|---|
| 6,038,599 A | 3/2000 | Black et al. | |
| 6,108,782 A | 8/2000 | Fletcher et al. | |
| 6,678,250 B1 | 1/2004 | Grabelsky et al. | |
| 2003/0039212 A1 | 2/2003 | Lloyd et al. | |
| 2006/0233183 A1* | 10/2006 | Soncodi ...................... | 370/401 |

FOREIGN PATENT DOCUMENTS

| | | |
|---|---|---|
| CN | 1402143 A | 3/2003 |
| CN | 1561078 A | 1/2005 |

OTHER PUBLICATIONS

European Search Report issued in European Patent Application No. 06026766.3—2416, dated May 10, 2007.
Farhang et al., "Policy-Based Quality of Service in 3G Networks," Bell Labs Technology, Bell Laboratories, May 2004, vol. 9 No. 1, pp. 31-40, Murrey Hill, NJ, USA.
Liu, "Integrating policy-based management and SLA performance monitoring," Proceedings of SPIE, [Online], vol. 4584, Oct. 2001, pp. 21-27, Retrieved from the Internet.

* cited by examiner

*Primary Examiner*—Melvin Marcelo
(74) *Attorney, Agent, or Firm*—Conley Rose, P.C.; Grant Rodolph (57) ABSTRACT

A method for monitoring network performance includes: sending correspondences between a remote network element and a plurality of IP addresses thereof from a network management device to a local network element; according to the correspondences, calculating performance parameters between the local IP address and the plurality of remote IP addresses respectively, by the local network element; making a statistics of the calculated performance parameters by the local network element. A network element for monitoring network performance, connected with a network management device and a remote network element, includes: a receiving unit, a performance parameter processing unit, a performance parameter statistics unit, and the transmitting unit. A network system for monitoring network performance is further provided. According to embodiments of this invention, the efficient measurement of network performance including IP QoS between each two MGWs of an IP network, RTP stream bandwidths, and the like, is realized, thus the message bandwidth of performance test can be saved and processing load of the network management device can be reduced.

17 Claims, 4 Drawing Sheets

| | |
|---|---|
| [TSKN=] | [ITMID=] |
| "beijing-guangzhou" | REVRTPPACKETS |
| | SENDRTPPACKETS |
| [LIP=] | REVRTP BYTES |
| | SENDRTP BYTES |
| "10.10.214.26" | LREVRTPPACKETS |
| | MAXLRATE |
| [RIP =] | MAXLRATESIP |
| | MAXL RATEDIP |
| "10.10.118.58", "10.10.118.59", | MINLRATE |
| "10.10.118.60", "10.10.118.61", | MINLRATESIP |
| "10.11.211.30", "10.11.211.31", | MINLRATEDIP |
| "10.11.211.32", "10.11.211.33", | MAXDE LAYJITTER |
| "10.12.10.8" | MAXDELAYJITTERSIP |
| | MAXDELAY JITTERDIP |
| [SPD=1] | MINDELAYJI TTER |
| | MINDELAYJITTERSIP |
| SP1S=00&00, | MINDELAYJITTER DIP |
| SP1E=00&00, | MAXCIRCLEDELAY |
| PRD=M1 (1 Minute) | MAXCIRCLEDELAYSIP |
| | MAXCIRCLEDELAYLI P |
| | MINCIRCLEDELAY |
| | MINCIRCLEDELAYSIP |
| | MIN CIRCLEDELAYLIP |
| | RE CVRTPBAND |
| A Example of | SENTRTPBAND |
| CRE IPQOSTSK:MU=IPQOSMEASURE | LOSTRATE EXCEEDTHRD |
| | DELAYJITTERE XCEEDTHRD |
| | CIRCLEDELAYEXCEEDTHRD |

FIG. 4

METHOD, DEVICE AND SYSTEM FOR MONITORING NETWORK PERFORMANCE

CROSS REFERENCE TO RELATED APPLICATIONS

This application claims priority to Chinese Patent Application 200510121232.3 filed Dec. 22, 2005.

FIELD OF THE INVENTION

The present invention relates to network communication, and more particularly to a method, device and system for monitoring network performance.

BACKGROUND OF THE INVENTION

Transmitting data converted from voice signals via an IP network can greatly save transmission bandwidth and establishing time. At present, a Next Generation Network (NGN) and a WCDMA core network with R4 architecture are implemented gradually throughout the world. However, delay, jitter and packet loss occur frequently due to the speciality of IP network, which bring a great adverse effect on quality of voice. The monitoring of end-to-end Quality of Service (QoS) of a large-scale NGN and bandwidth of Real-time Transport Protocol (RTP) streams has become an important technical issue in the NGN.

Figure 1:
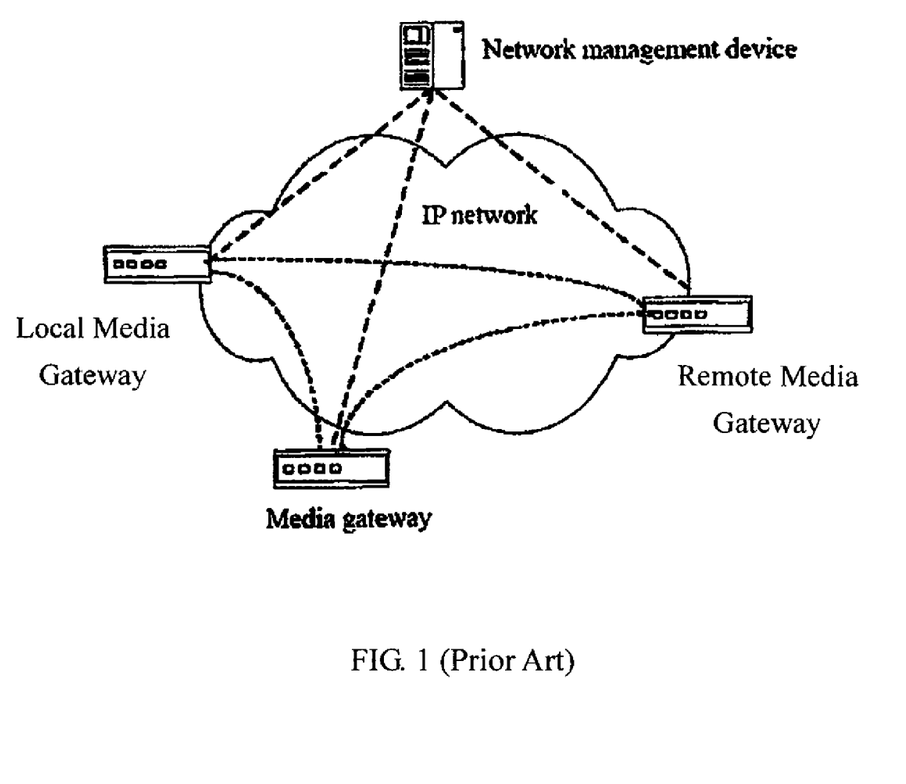
FIG. 1 is a schematic diagram of topology architecture of an IP network system in the prior art.

FIG. 1 is a schematic diagram of topology architecture of an IP network system in the prior art. According to a statistical method of an IP QoS specified by Real-time Transport Control Protocol (RTCP)/Real-time Transport Protocol (RTP), a voice IP QoS value to the remote IP address can be obtained on a Media Gateway (MGW) through a statistics, and the bandwidth between two MGWs can be obtained through a statistics using RTP streams.

In medium-scale or large-scale NGNs, an MGW can process data streams with a bandwidth up to several hundred megabits or wider. In this case, the MGW is required to be equipped with multiple Gigabit Ethernet (GE) ports or Fast Ethernet (FE) ports, and each of the ports is required to be configured with an IP address, so that there are multiple IP channels between this MGW and any other MGW. Since the MGW knows only its own IP address, and no direction towards another MGW is considered, if the MGW makes a statistics of the QoS value to each remote IP address respectively by using the statistical method of the IP QoS in RTCP/RTP protocols, this will lead to repeated statistics of the IP QoS to multiple IP addresses between one MGW and another MGW, statistical straggling of RTP streams, and a large amount of statistical messages must be reported, so that the bandwidth of a management channel of an Operation & Maintenance Center (OMC) is occupied and processing load of a network management device is increased.

For example, in a medium-scale NGN including fifteen MGWs, each of the MGWs is configured with two IP addresses. Within one statistical period, each of the MGWs reports 2×(14×2)=56 messages, so the fifteen MGWs report 15×56=840 messages in all.

However, a large-scale NGN may be equipped with several hundred of MGWs, each of the MGWs may be configured with no less than one IP address. Accordingly, the number of statistical messages due to the use of this statistical method will be increased in geometric progression, so that both of the bandwidth of network and the network management device are overloaded, and the statistical messages are not capable of expressing the historical situation and the bandwidth of an IP QoS between two MGWs clearly.

SUMMARY OF THE INVENTION

Embodiments of the present invention provide a method, device and system for monitoring network performance. In an IP network such as a next generation network or a wireless core network with R4 architecture, measurement of network performances including IP quality of service, bandwidth of RTP streams and the like among network elements is realized.

A method for monitoring network performance according to an embodiment of the present invention, includes the processes of:

sending correspondences between a remote network element and a plurality of IP addresses thereof from a network management device to a local network element;

according to the correspondences, calculating performance parameters between the local IP address and the plurality of remote IP addresses respectively, by the local network element;

making a statistics of the calculated performance parameters by the local network element.

Another embodiment of the present invention provides a network element device in an IP network, connected with a network management device and a remote network element, wherein the network element device includes:

a receiving unit for receiving correspondences, between a remote network element and multiple IP addresses thereof, sent by a network management device;

a performance parameter processing unit for calculating performance parameters between a local IP address and the multiple remote IP addresses respectively, in accordance with the correspondences; and a performance parameter statistics unit for making a statistics of the multiple calculated performance parameters.

A further embodiment of the present invention provides a network system for monitoring network performance, including: a network management device, and a network element device; wherein the network element device includes:

a receiving unit for receiving correspondences, between a remote network element and multiple IP addresses thereof, sent by a network management device;

a performance parameter processing unit for calculating performance parameters between a local IP address and the multiple remote IP addresses respectively, in accordance with the correspondences; and a performance parameter statistics unit for making a statistics of the multiple calculated performance parameters.

As described above, according to embodiments of the present invention, the efficient measurement of network performance including IP QoS between each two MGWs of an IP network, RTP stream bandwidths, and the like, is realized, thus message bandwidth of performance test can be saved and processing load of the network management device can be reduced. Moreover, the historical situation of the IP QoS between every two MGWs can be expressed clearly, thus optimization of the IP network is enabled.

DETAILED DESCRIPTION OF THE INVENTION

Embodiments of the present invention are further described with reference to the attached drawings.

Figure 2:
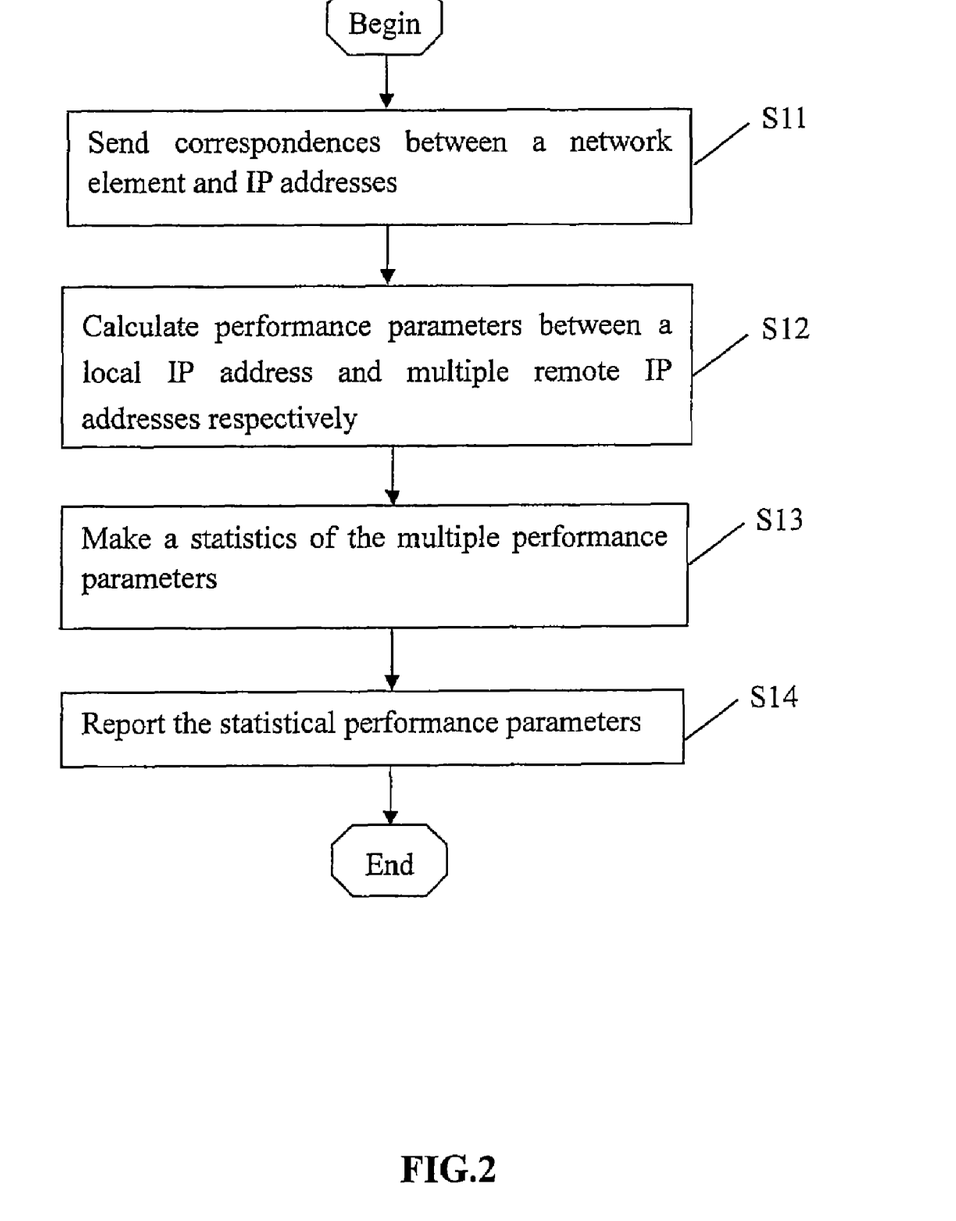
FIG. 2 is a flow chart of a method for monitoring network performance among network elements in an IP network according to an embodiment of the present invention.
Figure 4:
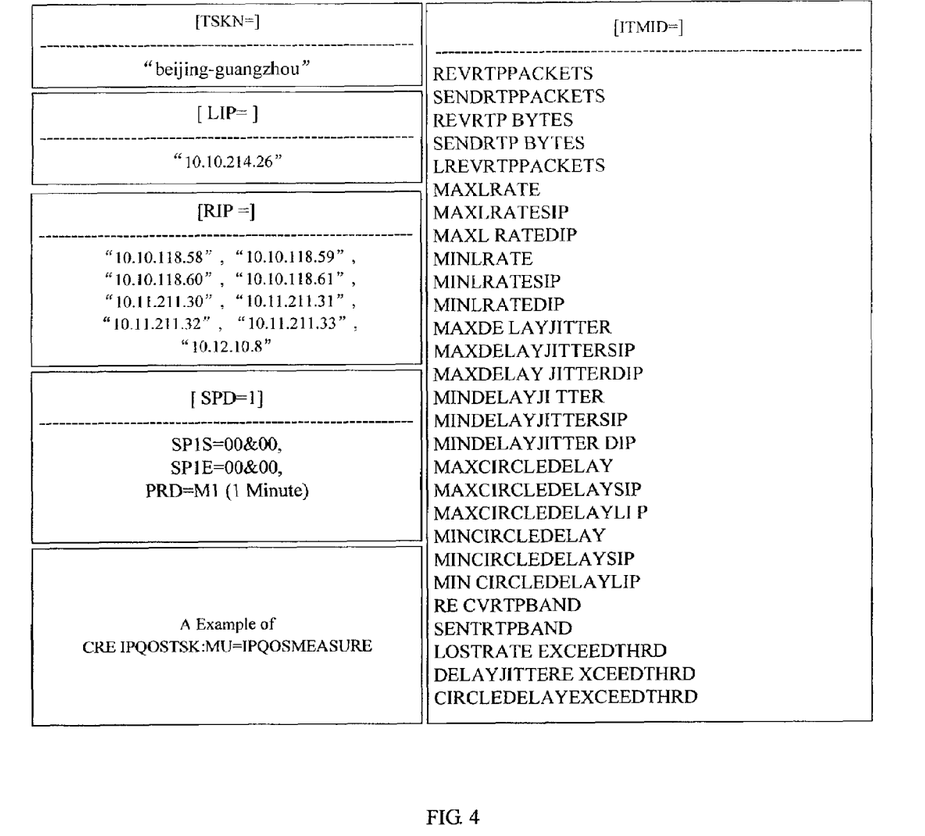
FIG. 4 is a diagram of the example statistical task.

FIG. 2 is a flow chart of a method for monitoring network performance among network elements in an IP network according to an embodiment of the present invention. In an IP network such as an NGN, a network management device sends a message to each network element such as an MGW to request for a feedback of an IP address of an RTP port, the network element feeds back the IP address of the corresponding port, and the network management device establishes a correspondence between a remote network element and the IP address of the RTP port of the remote network element. In step S11, the network management device sends the correspondences between the remote MGW and a set of IP addresses thereof to the local MGW, and creates a statistical task of network performance. An example of creating a statistical task using commands is as follows:

CRE IPQOSTSK: TSKN="beijing-guangzhou"

MU=IPQOSMEASURE,SPD=1,SP1S=00&00, SP1E=00&00,PRD=M1,LIP="10.10.21 4.26",

RIP="10.10.118.58:10.10.118.59:10.10.118.60: 10.10.118.61&10.11.211.30:10.11.211. 31:10.11.211.32:10.11.211.33&10.12.10.8",

ITMID=REVRTPPACKETS&SENDRTPPACKETS&REVRTPBYTES&SENDRTP
BYTES&LREVRTPPACKETS&MAXLRATE&MAXLRATESIP&MAXLRATEDIP
&MINLRATE&MINLRATESIP&MINLRATEDIP&MAXDE
LAYJITTER&MAXDELAYJITTERSIP&MAXDELAYJITTERDIP&MINDELAYJI
TTER&MINDELAYJITTERSIP&MINDELAYJITTERDIP&MAXCIRCLEDELAY
&MAXCIRCLEDELAYSIP&MAXCIRCLEDELAYLI
P&MINCIRCLEDELAY&MINCIRCLEDELAYSIP&MINCIRCLEDELAYLIP&RE
CVRTPBAND&SENTRTPBAND&LOSTRATEEXCEEDTHRD&DELAYJITTERE
XCEEDTHRD&CIRCLEDELAYEXCEEDTHRD;

wherein TSKN represents a task name, and MU represents a measurement unit, a parameter value of "IPQOSMEASURE" represents a statistical IPQOS value; SPD=1, SP1S=00&00, SP1E=00&00, PRD=M1 represents that the task is performed periodically everyday, the statistical period is 1 minute (PRD=M1), the statistical duration is from 00:00 of a day to 00:00 of the next day; LIP represents the IP address of the local MGW, which is 10.10.214.26 in this example; RIP represents the IP address of the remote MGW, 3 sites of the remote MGW are included in this example, and each site has several IP addresses, for instance, the remote site 1 has 4 IP addresses of 10.10.118.58, 10.10.118.59, 10.10.118.60 and 10.10.118.61, respectively. ITMID represents item identities; the meaning of each of the item identities is as follows:

REVRTPPACKETS total number of received RTP packets

SENDRTPPACKETS total number of sent RTP packets

REVRTPBYTES total number of received RTP bytes (K bytes)

SENDRTPBYTES total number of sent RTP bytes (K bytes)

LREVRTPPACKETS total number of lost RTP packets to be received

MAXLRATE maximum packet loss rate obtained locally (%)

MAXLRATESIP local IP address for maximum packet loss rate

MAXLRATEDIP remote IP address for maximum packet loss rate

MINLRATE minimum packet loss rate obtained locally (%)

MINLRATESIP rate local IP address for minimum packet loss

MINLRATEDIP remote IP address for minimum packet loss rate

MAXDELAYJITTER maximum delay jitter obtained locally (ms)

MAXDELAYJITTERSIP local IP address for maximum delay jitter

MAXDELAYJITTERDIP remote IP address for maximum delay jitter

MINDELAYJITTER minimum delay jitter obtained locally (ms)

MINDELAYJITTERSIP local IP address for minimum delay jitter

MINDELAYJITTERDIP remote IP address for minimum delay jitter

MAXCIRCLEDELAY maximum circle delay obtained locally (ms)

MAXCIRCLEDELAYSIP local IP address for maximum circle delay

MAXCIRCLEDELAYLIP remote IP address for maximum circle delay

MINCIRCLEDELAY minimum circle delay obtained locally (ms)

MINCIRCLEDELAYSIP local IP address for minimum circle delay

MINCIRCLEDELAYLIP remote IP address for minimum circle delay

RECVRTPBAND received RTP stream bandwidth (K bytes/s)

SENTRTPBAND sent RTP stream bandwidth (K bytes/s)

LOSTRATEEXCEEDTHRD packet loss rate exceeding threshold (s)

DELAYJITTEREXCEEDTHRD delay jitter exceeding threshold (s)

CIRCLEDELAYEXCEEDTHRD circle delay exceeding threshold (s)

As an example, in the case that one local IP address corresponds to multiple remote IP addresses, the procedure of monitoring network performance between two MGWs is described. In the case that there are multiple local IP addresses, the procedure can be repeated. If a certain local IP address is not specified, it indicates a statistics of the QoS value and the volume between all the local IP addresses and the remote IP address.

Specifically, the network management device can set a threshold of QoS parameters, e.g., delay, jitter and packet loss rate by sending commands. For example, the jitter threshold is set to 30 ms, the thresholds of delay is set to 100 ms, and the packet loss rate is set to 0.01%:

SET IPQOSTHD: TSKN="beijing-guangzhou", MU=IPQOSMEASURE, JITTERTHRD=30, DELAYTHRD=100, LOSTTHRD=0.01.

In step S12, according to the sent correspondences between the remote MGW and the set of IP addresses thereof, the local MGW can create its own statistical task, and calculate the performance parameters, e.g. the QoS parameters and the RTP stream bandwidth parameters, between the local IP address and the multiple remote IP addresses in RTCP protocols. Specifically, the QoS parameters include one or more of delay, jitter and packet loss rate, the bandwidth parameters include the received stream bandwidth parameter and the sent stream bandwidth parameter.

In step S13, according to the correspondences, sent by the network management device, between the remote MGW and multiple IP addresses thereof, the local MGW makes a statistics of the multiple calculated performance parameters. The local MGW collects the statistical data reported by all interface boards, and obtains the QoS parameter and the RTP stream bandwidth parameter to the remote MGW by making a statistics of the calculated data between each IP address pair.

For the QoS parameters, the maximum value and the minimum value, e.g., the maximum/minimum delay value, the maximum/minimum jitter value and the maximum/minimum packet loss rate value, among the multiple QoS parameters between the local MGW and the multiple remote MGWs can be obtained by making a statistics. For example, a procedure of the determination of the maximum delay value is as follows: the local MGW periodically samples the current delay value for each IP address pair, taking the sampling during each RTCP measurement period as an example, the current RTCP delay value (Qa) is compared with the maximum RTCP delay value (Qmax) up to now; if Qa>Qmax, Qmax is updated to Qa, at the same time, and the corresponding local IP address and remote IP address are recorded. This step is performed during each RTCP measurement period within one statistical period, and the resultant Qmax is the maximum delay value among delays of all the IP address pairs. For another example, a procedure of determination of the minimum delay value is as follows: the IP QoS value (Qa) during the current RTCP measurement period is compared with the minimum RTCP delay value (Qmin) up to now; if Qa<Qmin, Qmin is updated to Qa, and the corresponding local IP address and remote IP address are recorded. This step is performed during each RTCP measurement period within one statistical period, and the resultant Qmin is the minimum delay value among delays of all the IP address pairs.

For the RTP stream bandwidth parameters, the local network element can sum up the multiple bandwidth parameters calculated in RTCP protocols. Preferably, the bandwidth parameters include the received stream bandwidth and the sent stream bandwidth. It is possible to sum up the received stream bandwidth and the sent stream bandwidth respectively, to determine the sum of multiple RTP stream bandwidth parameters.

At the same time, according to the thresholds of delay, jitter and packet loss rate set by the commands sent by the network management device, the local MGW can monitor the statistical data reported by the interface boards during each RTCP measurement period, and calculate and make a statistics of the duration for which the delay, jitter and packet loss rate between the local MGW and the multiple remote MGWs within a statistical period exceed the corresponding thresholds. For example, a set delay threshold is 100 ms, a particular procedure of making a statistics of the duration for which the delay value exceeds the threshold is as follows: the local MGW periodically samples the current delay value of each IP address pair, wherein the sampling period is the same as the RTCP measurement period; take each RTCP sampling as an example, if the delay of a certain IP address pair among multiple IP address pairs during current RTCP measurement period exceeds 100 ms, the duration of the RTCP measurement period should be added to the duration for which the delay value exceeds the threshold in proportion. For example, within a statistical period of 5 minutes, i.e., 300 seconds, in each sampling and comparison, there are delays exceeding the threshold during two RTCP measurement periods, therefore the duration for which the delay value exceeds the threshold within the statistical period is 2×RTCP measurement period.

Finally, in step S14, the local MGW reports the statistical performance parameters directed to the remote MGW to the network management device, wherein the statistical performance parameters include the maximum/minimum delay value, the maximum/minimum jitter value, the maximum/minimum packet loss rate value, total bandwidth of the received RTP stream, total bandwidth of the sent RTP stream, and the duration for which the delay, jitter and packet loss rate exceed the threshold. An example of the reported message is as follows:

TSKN=beijing-guangzhou

MU=IP QoS test

SPD=1 minute result serial number=14 result reliability=TRUE object instance=object name=IP address LIP=10.10.214.26

RIP=10.10.118.58:10.10.118.59:10.10.118.60:10.10.118.61 object parameter=10.10.214.26&10.10.118.58: 10.10.118.59:10.10.118.60:10.10.118.61 result generation time=2005-09-30 10:00:00

REVRTPPACKETS=7001000

SENDRTPPACKETS=7001020

REVRTPBYTES (k bytes)=1400200

SENDRTPBYTES (k bytes)=1400204

LREVRTPPACKETS=0

MAXLRATE (%)=0

MAXLRATESIP=0.0.0.0

MAXLRATEDIP=0.0.0.0

MINLRATE (%)=0

MINLRATESIP 0.0.0.0

MINLRATEDIP 0.0.0.0

MAXDELAYJITTER (ms)=100

MAXDELAYJITTERSIP=10.10.214.26

MAXDELAYJITTERDIP=10.10.118.60

MINDELAYJITTER (ms)=10

MINDELAYJITTERSIP=10.10.214.26

MINDELAYJITTERDIP=10.10.118.59

MAXCIRCLEDELAY (ms)=80

MAXCIRCLEDELAYSIP=10.10.214.26

MAXCIRCLEDELAYLIP=10.10.118.61

MINCIRCLEDELAY (ms)=10

MINCIRCLEDELAYSIP=10.10.214.26

MINCIRCLEDELAYLIP=10.10.118.58

RECVRTPBAND (k bytes/s)=23336.667

SENTRTPBAND (K bytes/s)=23336.667

LOSTRATEEXCEEDTHRD (s)=0

DELAYJITTEREXCEEDTHRD (s)=10

CIRCLEDELAYEXCEEDTHRD (s)=10

Figure 3:
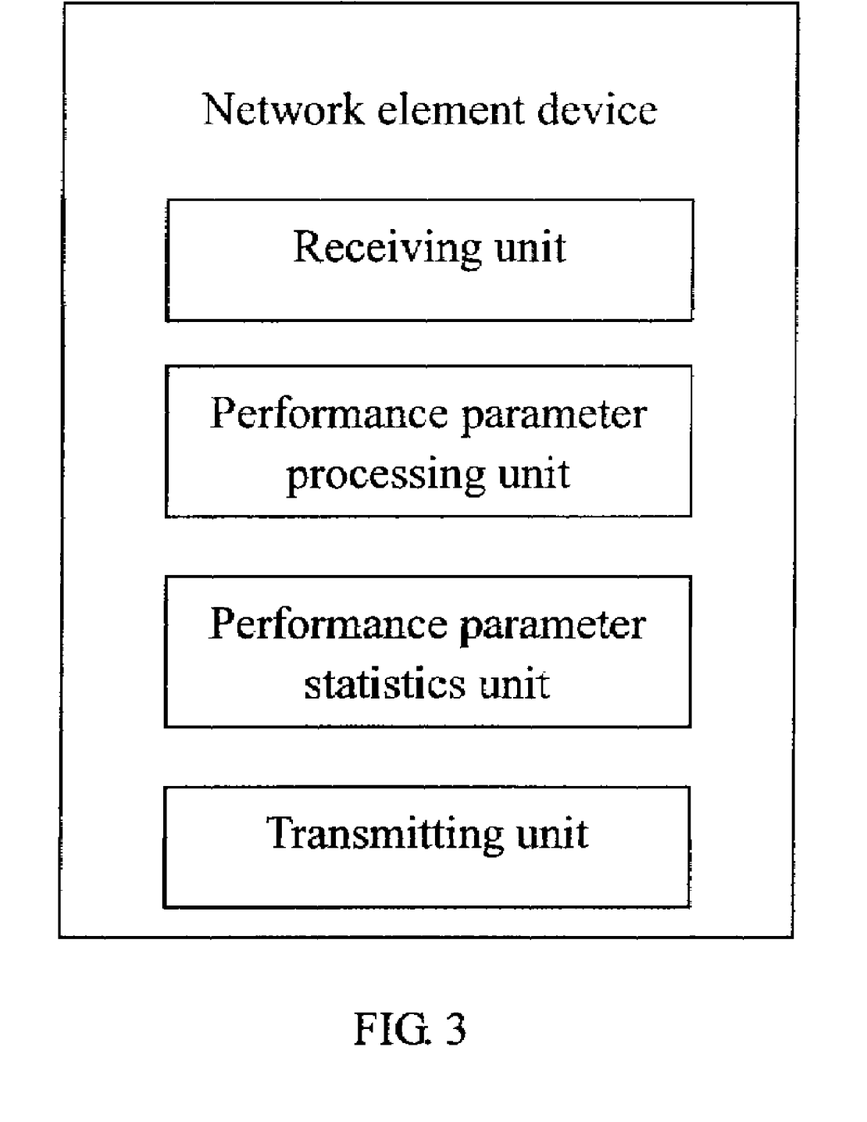
FIG. 3 is a schematic diagram of the network element device.

Further, an embodiment of the present invention provides a network element device in an IP network (such as an MGW), for realizing the monitoring of network performance. The network element device is connected with a network management device and a remote network element. The network element device includes:

a receiving unit for receiving correspondences, between a remote network element and multiple IP addresses thereof, sent by a network management device;

a performance parameter processing unit for calculating performance parameters between a local IP address and the multiple remote IP addresses respectively, in accordance with the correspondences;

a performance parameter statistics unit for making a statistics of the multiple calculated performance parameters and inputting a statistical result into a transmitting unit;

the transmitting unit for reporting the statistical result from the performance parameter statistics unit to the network management device.

The performance parameters include QoS parameters (such as delay, jitter, bandwidth parameters) and packet loss rate. The performance parameter statistics unit determines a maximum value and a minimum value among the multiple calculated QoS parameters, a sum of multiple bandwidth parameters and a duration for which multiple QoS parameters exceed the threshold, which are reported to the network management device by the transmitting unit.

The receiving unit receives a QoS parameter threshold sent by the network management device, the performance parameter statistics unit makes a statistics of the duration for which the plurality of QoS parameters exceed the threshold and determines a sum of the calculated plurality of bandwidth parameters, and the transmitting unit reports the sum to the network management device.

Another embodiment of the present invention provides a network system for realizing monitoring of network performance. The system includes a network management device and a network element device in an embodiment of the present invention.

The network system includes a next generation network system.

An illustrative description has been given to the present invention by example of a MGW used in an NGN. Furthermore, the present invention can also be used in any other network element device except the MGWs in IP network, which is appreciated by those skilled in the art.

Apparently, various changes and equivalent substitutions can be made to the present invention, without departing from the spirit and scope of the present invention, such changes and equivalent substitutions fall within the scope of the present invention as defined by the appended claims.

What is claimed is:

1. A method for monitoring network performance at a local network element, comprising the processes of:

receiving correspondences between a remote network element and a plurality of IP addresses thereof from a network management device;

according to the correspondences, calculating performance parameters between a local IP address and the plurality of remote IP addresses respectively, by the local network element; and making a statistics of the calculated performance parameters by the local network element.

2. The method according to claim 1, further comprising the process of reporting a statistical result to the network management device.

3. The method according to claim 2, wherein the performance parameters comprise quality of service parameters, and the method further comprises the processes of: determining a maximum value and a minimum value among the plurality of quality of service parameters calculated by the local network element, and reporting the maximum value and the minimum value to the network management device.

4. The method according to claim 1, wherein the local network element calculates the performance parameters between the local IP address and the plurality of remote IP addresses in RTCP protocols.

5. The method according to claim 1, wherein the performance parameters comprise quality of service parameters, and the method further comprises the processes of: sending a threshold of the quality of service parameters from the network management device to the local network element; and making a statistics of the duration for which the plurality of quality of service parameters exceed the threshold, by the local network element.

6. The method according to claim 1, wherein the performance parameters comprise bandwidth parameters, the process of making a statistics of the plurality of performance parameters further comprises the process of summing up the plurality of bandwidth parameters of the local network element, and the bandwidth parameters comprise a received stream bandwidth parameter and a sent stream bandwidth parameter.

7. The method according to claim 1, wherein the network comprises a next generation network.

8. The method according to claim 1, wherein the network element comprises a media gateway.

9. The method according to claim 2, wherein the local network element calculates the performance parameters between the local IP address and the plurality of remote IP addresses in RTCP protocols.

10. A network element device in an IP network, connected with a network management device and a remote network element, wherein the network element device comprises:

a receiving unit for receiving correspondences, between a remote network element and multiple IP addresses thereof, sent by a network management device;

a performance parameter processing unit for calculating performance parameters between a local IP address and the multiple remote IP addresses respectively, in accordance with the correspondences; and a performance parameter statistics unit for making a statistics of the multiple calculated performance parameters.

11. The network element device according to claim 10, further comprising a transmitting unit for reporting a statistical result from the performance parameter statistics unit to the network management device.

12. The network element device according to claim 10, wherein the performance parameters comprise quality of service parameters, the performance parameter statistics unit determines a maximum value and a minimum value among the calculated plurality of quality of service parameters, which are reported to the network management device by the transmitting unit.

13. The network element device according to claim 10, wherein the performance parameters comprise quality of service parameters and bandwidth parameters, wherein the receiving unit receives a threshold of quality of service parameters sent by the network management device, the performance parameter statistics unit makes a statistics of the duration for which the plurality of QoS parameters exceed the threshold and determines a sum of the calculated plurality of bandwidth parameters, and the transmitting unit reports the sum to the network management device.

14. The network element device according to claim 10, wherein the network element device comprises a media gateway.

15. A network system for monitoring network performance, comprising: a network management device, and a network element device; wherein the network element device comprises:

a receiving unit for receiving correspondences, between a remote network element and multiple IP addresses thereof, sent by a network management device;

a performance parameter processing unit for calculating performance parameters between a local IP address and the multiple remote IP addresses respectively, in accordance with the correspondences; and a performance parameter statistics unit for making a statistics of the multiple calculated performance parameters.

16. The network system according to claim 15, wherein the network element device further comprises a transmitting unit for reporting a statistical result from the performance parameter statistics unit to the network management device.

17. The network system according to claim 15, wherein the P network system comprises a next generation network.

\* \* \* \* \*

UNITED STATES PATENT AND TRADEMARK OFFICE
CERTIFICATE OF CORRECTION

PATENT NO. : 7,653,005 B2 Page 1 of 1
APPLICATION NO. : 11/615177
DATED : January 26, 2010
INVENTOR(S) : Zou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 599 days.

Signed and Sealed this

Twenty-eighth Day of December, 2010

David J. Kappos
*Director of the United States Patent and Trademark Office*